United States Patent
Youtz et al.

(10) Patent No.: US 8,213,537 B2
(45) Date of Patent: Jul. 3, 2012

(54) APPARATUSES, SYSTEMS, AND METHODS FOR REDUCING SPURIOUS EMISSIONS RESULTING FROM CARRIER LEAKAGE

(75) Inventors: Andrew Youtz, Rocky Hill, NJ (US); Iftekhar Rahman, Billerica, MA (US); Pingping Zong, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 750 days.

(21) Appl. No.: 12/358,526

(22) Filed: Jan. 23, 2009

(65) Prior Publication Data

US 2010/0189190 A1   Jul. 29, 2010

(51) Int. Cl.
*H04L 25/03* (2006.01)
*H04L 27/20* (2006.01)
*H04B 1/04* (2006.01)

(52) U.S. Cl. ............ 375/297; 375/308; 455/114.3
(58) Field of Classification Search .......... 375/295–298, 375/308; 455/108, 114.2, 114.3, 116; 333/149; 381/94.1
See application file for complete search history.

(56) References Cited

U.S. PATENT DOCUMENTS

| | | | |
|---|---|---|---|
| 6,526,262 B1 * | 2/2003 | Kurlovich | 455/75 |
| 6,618,096 B1 * | 9/2003 | Stapleton | 348/608 |
| 2004/0090364 A1 * | 5/2004 | Le Naour et al. | 342/350 |

* cited by examiner

*Primary Examiner* — Young T. Tse

(57) ABSTRACT

An exemplary apparatus includes a modulator configured to modulate a data signal onto a carrier signal to generate a modulated signal having a transmit frequency within a predefined frequency range adjacent to and within a boundary of an uplink frequency band, a filter configured to at least partially remove a carrier frequency component from the modulated signal to produce a filtered modulated signal, and an antenna configured to transmit the filtered modulated signal.

19 Claims, 18 Drawing Sheets

APPARATUSES, SYSTEMS, AND METHODS FOR REDUCING SPURIOUS EMISSIONS RESULTING FROM CARRIER LEAKAGE

BACKGROUND INFORMATION

As the use of wireless broadband technology has proliferated, restrictions have been put in place to regulate how wireless signals are transmitted and received. In the United States, for example, the Federal Communications Commission ("FCC") has implemented various regulations to control spurious emissions that may cause interfere between signals in adjacent frequency bands or channels. Such spurious emissions are commonly caused by intermodulation products produced by signal transmitters.

One traditional approach used to reduce spurious emissions includes reducing the amount of transmit power that is used to transmit wireless signals. A reduction in transmit power, however, often results in decreased signal coverage within a designated geographic area or cell. Moreover, a reduction of transmit power may not be sufficiently effective in instances where a signal is transmitted with a frequency relatively close to a boundary of an operating frequency band or channel.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Apparatuses, systems, and methods for reducing spurious emissions resulting from carrier leakage are described herein.

An exemplary apparatus includes a modulator configured to modulate a data signal onto a carrier signal to generate a modulated signal having a transmit frequency within a predefined frequency range adjacent to and within a boundary of an uplink frequency band, a filter configured to at least partially remove a carrier frequency component from the modulated signal to produce a filtered modulated signal, and an antenna configured to transmit the filtered modulated signal.

An exemplary system includes a processing facility configured to generate a first data signal and a second data signal and a transmitter facility communicatively coupled to the processing facility. The transmitter facility is configured to modulate the first data signal onto a carrier signal to generate a modulated first signal having a transmit frequency within a predefined frequency range adjacent to and within a boundary of an uplink frequency band, modulate the second data signal onto another carrier signal to generate a modulated second signal having a transmit frequency within the uplink frequency band and outside the predefined frequency range, at least partially remove a carrier frequency component from the modulated first signal to produce a filtered modulated first signal, and transmit the filtered modulated first signal and the modulated second signal.

An exemplary method includes modulating a data signal onto a carrier signal to generate a modulated signal having a transmit frequency within a predefined frequency range adjacent to and within a boundary of an uplink frequency band, at least partially removing a carrier frequency component from the modulated signal with a filter to produce a filtered modulated signal, and transmitting the filtered modulated signal.

An exemplary method includes generating a first modulated signal having a transmit frequency within a predefined frequency range adjacent to and within a boundary of an uplink frequency band, generating a second modulated signal having a transmit frequency within the uplink frequency band and outside the predefined frequency range, enabling a filter to selectively remove a carrier frequency component from the first modulated signal, and disabling the filter to prevent the filter from removing a carrier frequency component from the second modulated signal.

The apparatuses, systems, and methods described herein may facilitate compliance with one or more spurious emissions limits without reducing power levels at which wireless signals are transmitted. In this manner, signal coverage within a geographic area or cell may be maximized.

Figure 1:
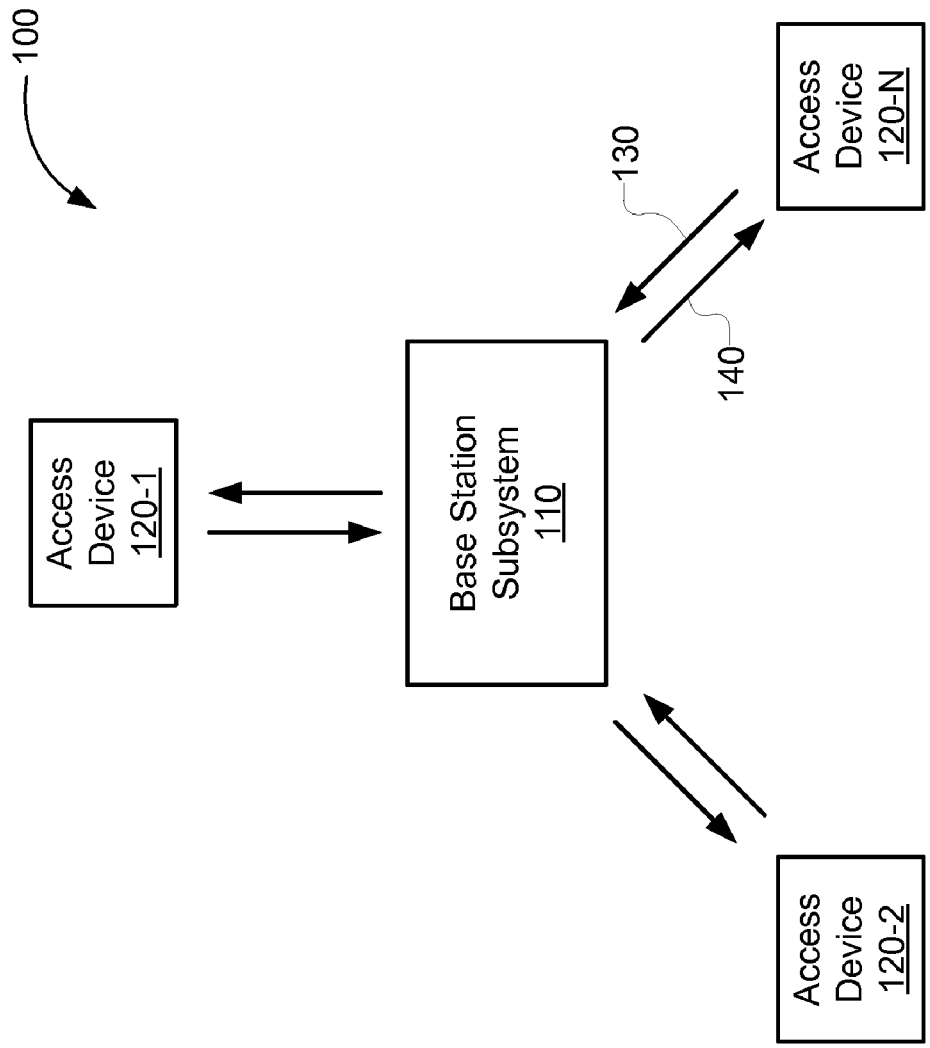
FIG. 1 illustrates an exemplary wireless communication system according to principles described herein.

FIG. 1 illustrates an exemplary wireless communication system 100. Wireless communication system 100 (or simply "system 100") may include a base station subsystem 110 communicatively coupled to a plurality of access devices 120-1 through 120-N, collectively referred to herein as "access devices 120". Access devices 120 may be configured to transmit data to base station subsystem 110 via one or more communication channels referred to as uplinks 130 and receive data from base station subsystem 110 via one or more communication channels referred to as downlinks 140.

Base station subsystem 110 may be configured to wirelessly communicate with various access devices 120 and/or other base station subsystems. To this end, base station subsystem 110 may include one or more transmitters and receivers, each of which may include a plurality of components associated with signal transmission and reception (e.g., processors, modulators, amplifiers, filters, multiplexers, demodulators, demultiplexers, antennas, etc.).

Each access device 120 may include any device configured to perform one or more of the processes described herein, including wirelessly transmitting and receiving content, data associated with content (e.g., control data), and/or content operation commands to/from base station subsystem 110 and/or other access devices 120. Access devices 120 may each include, but are not limited to, a mobile or cellular phone, a smart phone, a satellite radio, a broadband enabled device, a Global Positioning System ("GPS") device, a personal digital assistant, a media player device, a vehicular computing and/or communication device, a gaming device, a base station, and/or any other device configured to acquire, transmit, receive, access, and/or otherwise process wireless communication signals.

Base station subsystem 110 and access devices 120 may communicate using any wireless communication platforms and technologies suitable for transporting data representative of content, control data, content management commands, and/or other communications, including known communication technologies, devices, media, and protocols supportive of wireless communications. Examples of such communication technologies, devices, media, and protocols include, but are not limited to, second generation ("2G") wireless communication technologies, third generation ("3G") wireless communication technologies, fourth generation ("4G") wireless communication technologies, Long term evolution ("LTE") technologies, Third Generation Partnership Project ("3GPP") technologies, Third Generation Partnership Project 2 ("3GPP2") technologies, Universal Mobile Telephone System ("UMTS") technologies, Global System for Mobile Communications ("GSM") technologies, Time Division Multiple Access ("TDMA") technologies, Code Division Multiple Access ("CDMA") technologies (e.g., Wideband Code Division Multiple Access ("WCDMA") technologies), Time Division Duplexing ("TDD") technologies, Frequency-Division Duplexing ("FDD") technologies, High Speed Packet Access ("HSPA") technologies, Orthogonal Frequency Division Multiplexing ("OFDM") technologies, Evolution Data Optimized Protocol ("EVDO"), radio frequency ("RF") signaling technologies, in-band and out-of-band signaling technologies, and other suitable communications platforms and technologies.

In some examples, system 100 may include any computer hardware and/or instructions (e.g., software programs), or combinations of software and hardware, configured to perform the processes described herein. The processes described herein may be implemented at least in part as computer-executable instructions, i.e., instructions executable by one or more computing devices, tangibly embodied in a computer-readable medium. In general, a processor (e.g., a microprocessor) receives instructions, from a computer-readable medium (e.g., a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, base station subsystem 110 and access devices 120 may communicate via one or more wireless networks or air interfaces, including, but not limited to, broadband networks, closed media networks, satellite networks, local area networks, public networks, private networks, and/or any other networks or air interfaces capable of wirelessly carrying data and communications signals between base station subsystem 110 and access devices 120.

Figure 2:
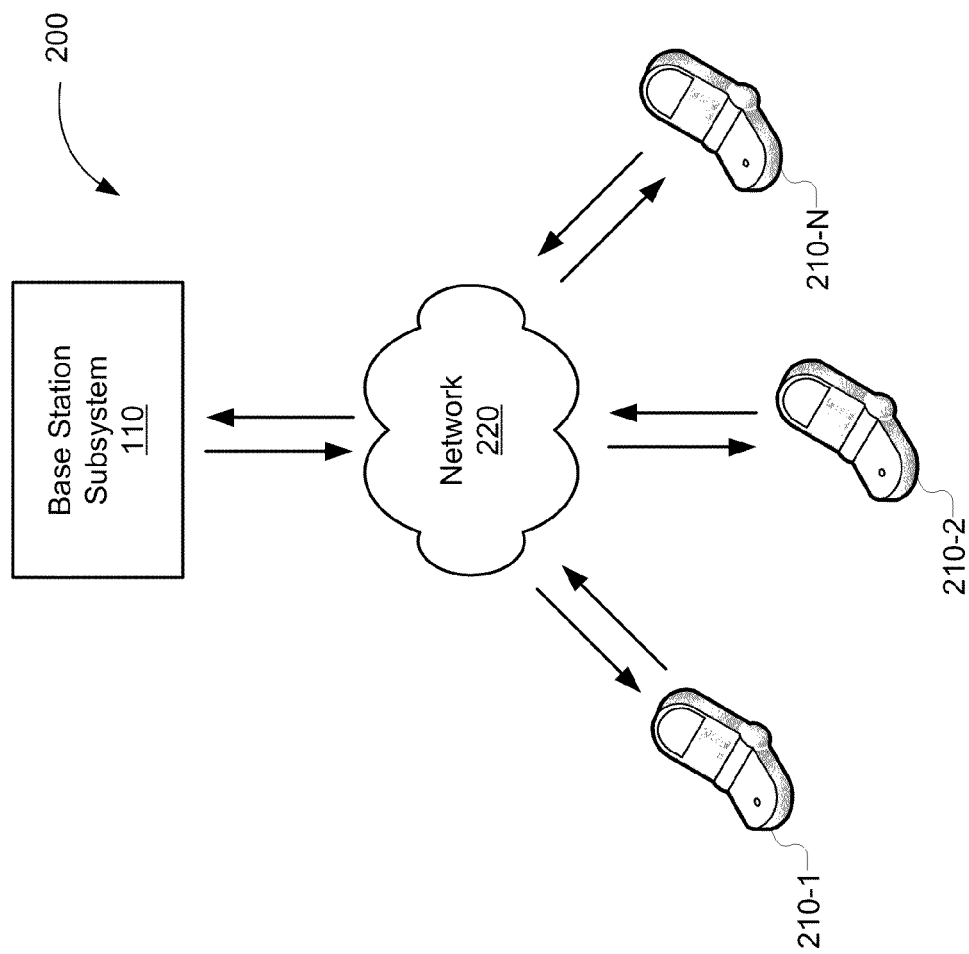
FIG. 2 shows an exemplary implementation of the system of FIG. 1 according to principles described herein.

FIG. 2 shows an exemplary implementation 200 of system 100 wherein access devices 120 include mobile phones 210-1 through 210-N (collectively "mobile phones 210"). As shown in FIG. 2, base station subsystem 110 and mobile phones 210 are communicatively coupled via a network 220. Network 220 may alternatively be referred to as an "air interface". While FIG. 2 shows mobile phones 210, other access devices 120 may additionally or alternatively be communicatively coupled to base station subsystem 110 via network 220 as may serve a particular application. Network 220 may include one or more networks, including, but not limited to, any of the networks listed above. Communications between base station subsystem 110 and access devices 120 may be transported using any one of above-listed networks, or any combination or sub-combination of the above-listed networks.

Base station subsystem 110 and access devices 120 are typically required by the FCC and/or other regulatory agencies to transmit wireless signals within specified frequency bands. Each frequency band includes a range of frequencies within which the base station subsystem 110 and access devices 120 may operate. Various regulations have also been implemented to prevent out-of-band emissions (e.g., spurious emissions) into adjacent frequency bands. In this manner, signal interference between different classes of devices operating within different frequency bands may be prevented.

Figure 3:
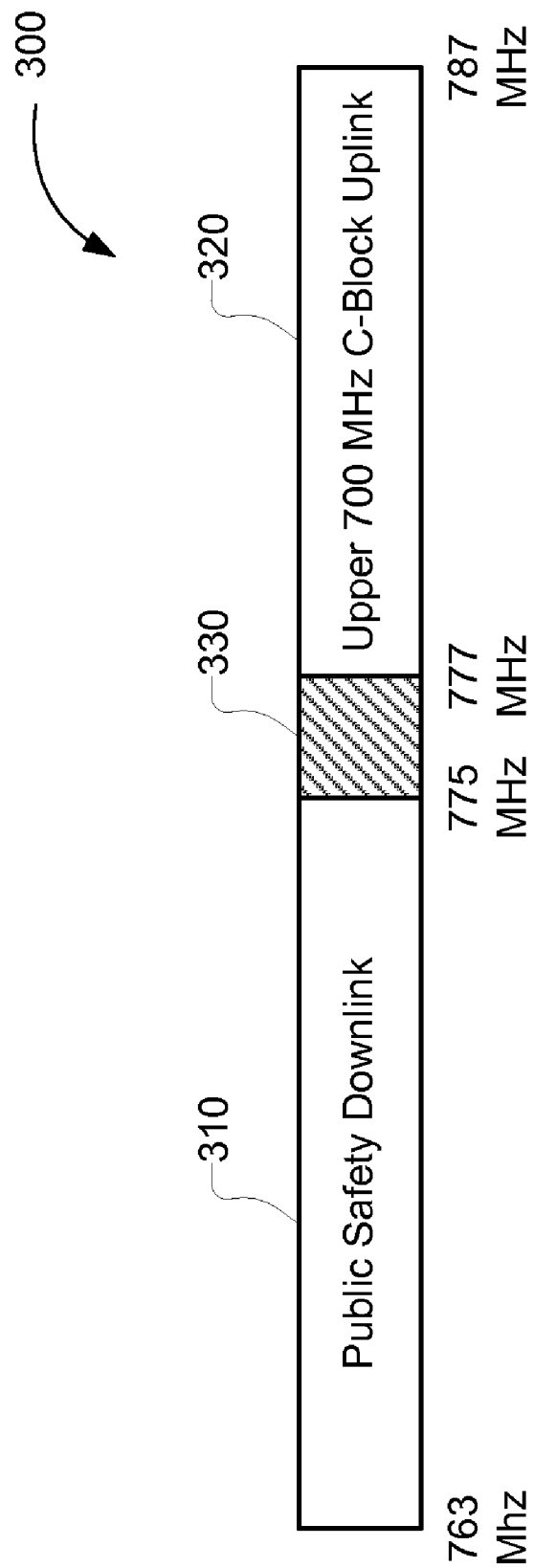
FIG. 3 illustrates an exemplary frequency band allocation within a range of frequencies according to principles described herein.

FIG. 3 illustrates an exemplary frequency band allocation 300 within a range of frequencies known as the 700 megahertz ("MHz") band. The 700 MHz band includes frequencies between 698 and 806 MHz and has recently been made available for wireless services, including public safety and commercial services.

As shown in FIG. 3, a first frequency band 310 including frequencies between 763 MHz and 775 MHz may be designated as a downlink frequency band for use by public safety devices. A second frequency band 320 including frequencies between 777 MHz and 787 MHz may be designated as an uplink band for commercial wireless devices and is included within a band often referred to as the "Upper 700 MHz C-Block". The beginning and end frequencies of each frequency band may be referred to as "boundary frequencies" or simply "boundaries". For example, the boundaries of frequency band 320 shown in FIG. 3 are 777 MHz and 787 MHz.

A two MHz guard band 330 may separate downlink frequency band 310 and uplink frequency band 320. Guard band 330 includes unused frequencies and may serve to prevent some types of interference between signals transmitted in the two bands 310 and 320. However, because some guard bands, such as guard band 330, are relatively small, they do not completely prevent out-of-band emissions. Such out-of-band emissions are especially problematic when an uplink band is adjacent to a download band, such as is shown in FIG. 3. It will be recognized that references to frequency bands being "adjacent to" one another in the examples given herein may refer to frequency bands separated only by a guard band. Hence, downlink frequency band 310 and uplink frequency band 320 are adjacent to one another for purposes of the present description.

It will be recognized that FIG. 3 shows only two of the main frequency bands contained within the 700 MHz band. It will also be recognized that the boundaries of each frequency band shown in FIG. 3 are merely illustrative and that they may be differ as may serve a particular regulation or standard. Moreover, the systems and methods described herein may apply to any frequency band within the frequency spectrum.

Figure 4:
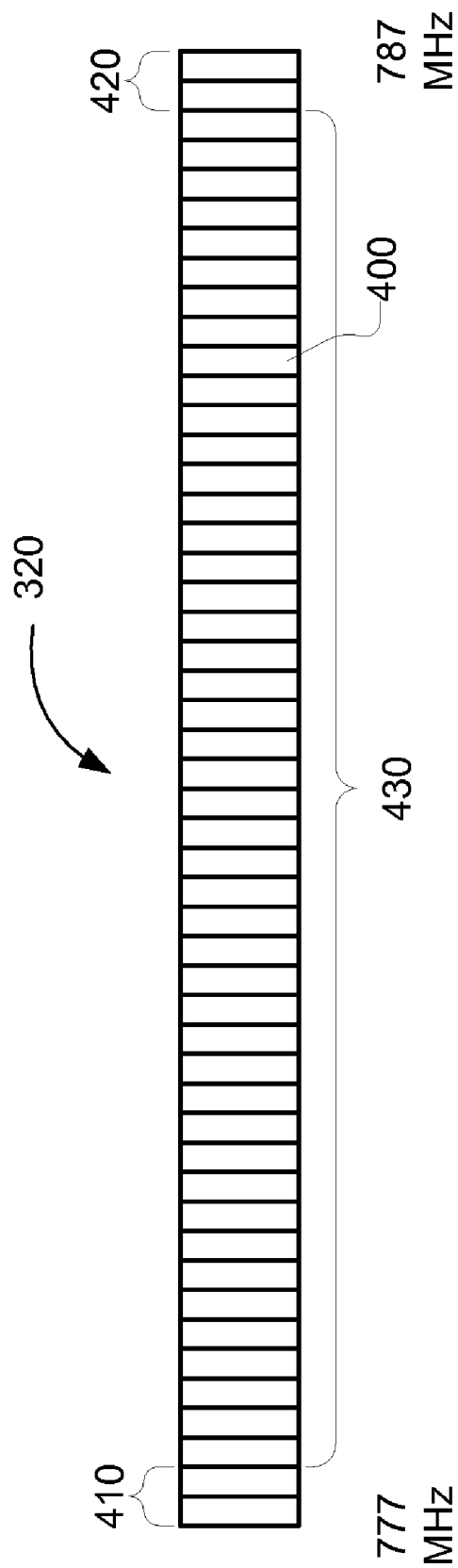
FIG. 4 shows a frequency band divided into a plurality of resource blocks according to principles described herein.

In some examples, a frequency band may be divided into a plurality of resource blocks each having a specified bandwidth. For example, FIG. 4 shows frequency band 320 divided into fifty resource blocks 400 each having a bandwidth of 0.2 MHz. It will be recognized that each resource block may alternatively have any other bandwidth as may serve a particular application. For example, in some LTE configurations, each resource block has a bandwidth of 0.18 MHz.

In some examples, one or more of the resource blocks are allocated for the transmission of control data signals and one or more of the resource blocks are allocated for the transmission of content data signals. Control data signals convey control information including, but not limited to, channel quality indication ("CQI") information, acknowledgement information ("ACK/NACK" information), uplink scheduling requests, etc. An exemplary control data signal used in LTE configurations includes a physical uplink control channel ("PUCCH") signal used to transmit control data within an uplink frequency band. Content data signals convey data representative of content, such as, but not limited to, voice content, media content, broadband content, email, Short Message Service ("SMS") messages, Multimedia Message Service ("MMS") messages, instant messages, and/or other content as may serve a particular application. An exemplary content data signal used in LTE configurations includes a physical uplink shared channel ("PUSCH") signal used to transmit content data within an uplink frequency band. In some alternative examples, a PUSCH signal may include both control and content data.

In some examples, one or more resource blocks 400 within a predefined frequency range adjacent to a boundary of a frequency band are allocated for transmission of control data signals. For example, as shown in FIG. 4, the first two resource blocks 410 and the last two resource blocks 420 within frequency band 320 are allocated for transmission of control data signals (e.g., PUCCH signals). It will be recognized that any number of resource blocks 400 adjacent to the boundary of frequency band 320 may be allocated for transmission of control data signals as may serve a particular implementation. The remaining resource blocks 430 may be allocated for transmission of content data signals (e.g., PUSCH signals).

Figure 5:
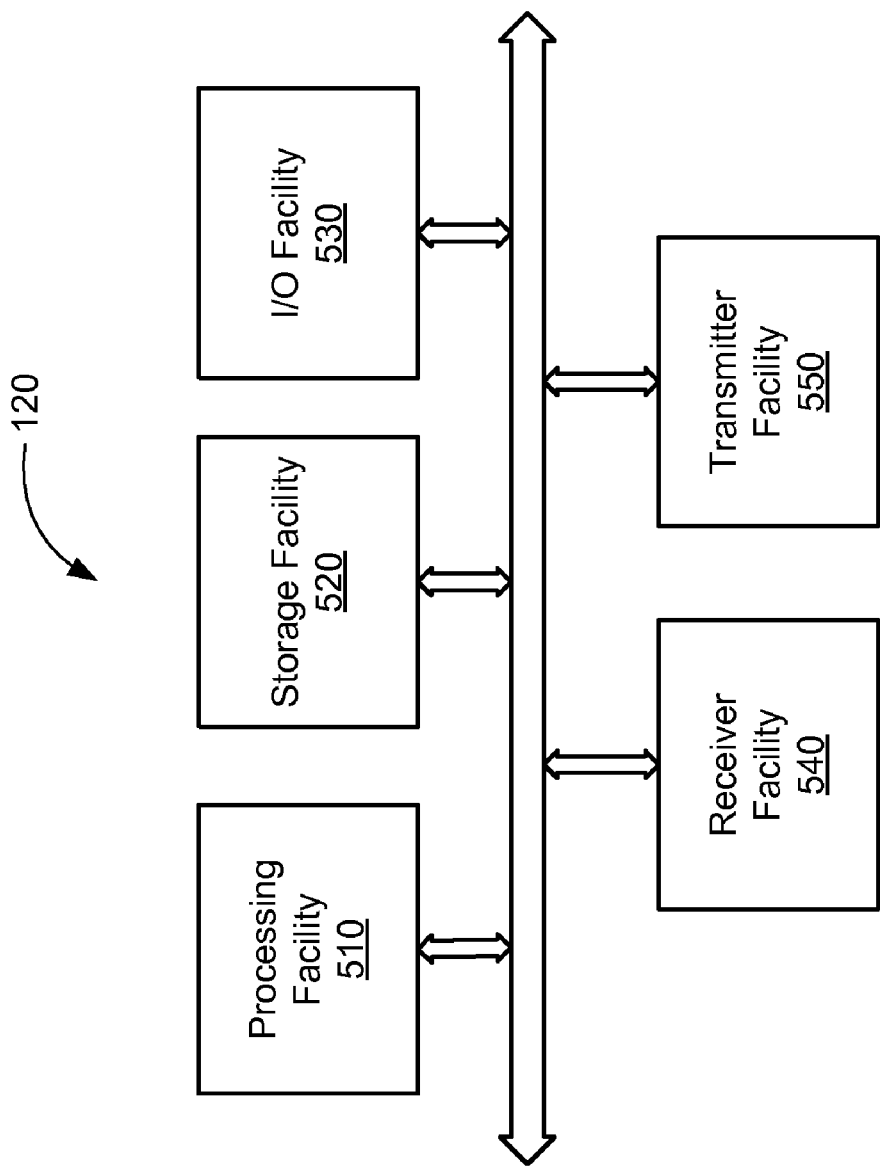
FIG. 5 illustrates components of an exemplary access device according to principles described herein.

FIG. 5 illustrates components of an exemplary access device 120. As shown in FIG. 5, access device 120 may include a processing facility 510, storage facility 520, input/output ("I/O") facility 530, receiver facility 540, and transmitter facility 550 communicatively connected to one another. The facilities 510-550 may be communicatively connected using any suitable technologies. Each of the facilities 510-550 may be implemented as hardware, computing instructions (e.g., software) tangibly embodied on a computer-readable medium, or a combination of hardware and computing instructions configured to perform one or more of the processes described herein. In certain embodiments, for example, transmitter facility 550 may include a combination of hardware and software, which software may be embodied on a computer-readable medium such as storage facility 520 and configured to direct processing facility 510 of the access device 120 to execute one or more of the processes described herein.

Processing facility 510 may be configured to execute and/or direct execution of operations of one or more components of the access device 120. Processing facility 510 may direct execution of operations in accordance with computer-executable instructions such as may be stored in storage facility 520 or another computer-readable medium. For example, processing facility 510 may be configured to generate and/or perform one or more signal processing operations on one or more control data signals and/or content data signals to be transmitted by transmitter facility 550.

Storage facility 520 may include one or more data storage media, devices, or configurations and may employ any type, form, and combination of storage media. For example, the storage facility 520 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 520.

Different types of data may be maintained within storage facility 520 as may serve a particular application. For example, control data and/or content data may be maintained by storage facility 520. It will be recognized that data stored within storage facility 520 may additionally or alternatively be stored in any other storage medium as may serve a particular application.

I/O facility 530 may be configured to receive user input and provide user output and may include any hardware, firmware, software, or combination thereof supportive of input and output capabilities. For example, I/O facility 530 may include one or more devices for capturing or otherwise creating content, including, but not limited to, a still-shot camera, video camera, scanner, microphone, side loading device, keyboard or keypad, touch screen component, and/or receiver (e.g., an RF or infrared receiver). Accordingly, a user of access device 120 may create or otherwise acquire content (e.g., by talking into a microphone, taking a picture, or creating a media file). In some examples, the acquired content may be transmitted to base station subsystem 110 for distribution to one or more other access devices 120.

I/O facility 530 may additionally or alternatively include one or more devices for presenting content for experiencing by a user, including, but not limited to, a graphics engine, a display, one or more display drivers, one or more audio speakers, and one or more audio drivers. Accordingly, I/O facility 530 may present content (e.g., play back and/or display) for experiencing by a user. I/O facility 530 may also be configured to provide other output for a user, such as one or more graphical user interfaces.

Receiver facility 540 may be configured to receive one or more signals transmitted to access device 120 from base station subsystem 110 via downlink 140. To this end, receiver facility 540 may include hardware (e.g., one or more antennas, demodulators, etc.), computer-readable instructions embodied on a computer-readable medium such as storage facility 520 (e.g., digital signal processing software), or a combination of hardware and computer-readable instructions. Receiver facility 540 may be configured to interface with any suitable communication media, protocols, formats, platforms, and networks, including any of those mentioned herein.

Transmitter facility 550 may be configured to transmit one or more control and/or content data signals to base station subsystem 110 via uplink 130. To this end, transmitter facility 550 may include hardware (e.g., one or more antennas, modulators, switches, etc.), computer-readable instructions embodied on a computer-readable medium such as storage facility 520 (e.g., digital signal processing software), or a combination of hardware and computer-readable instructions. Transmitter facility 550 may be configured to interface with any suitable communication media, protocols, formats, platforms, and networks, including any of those mentioned herein.

Figure 6:
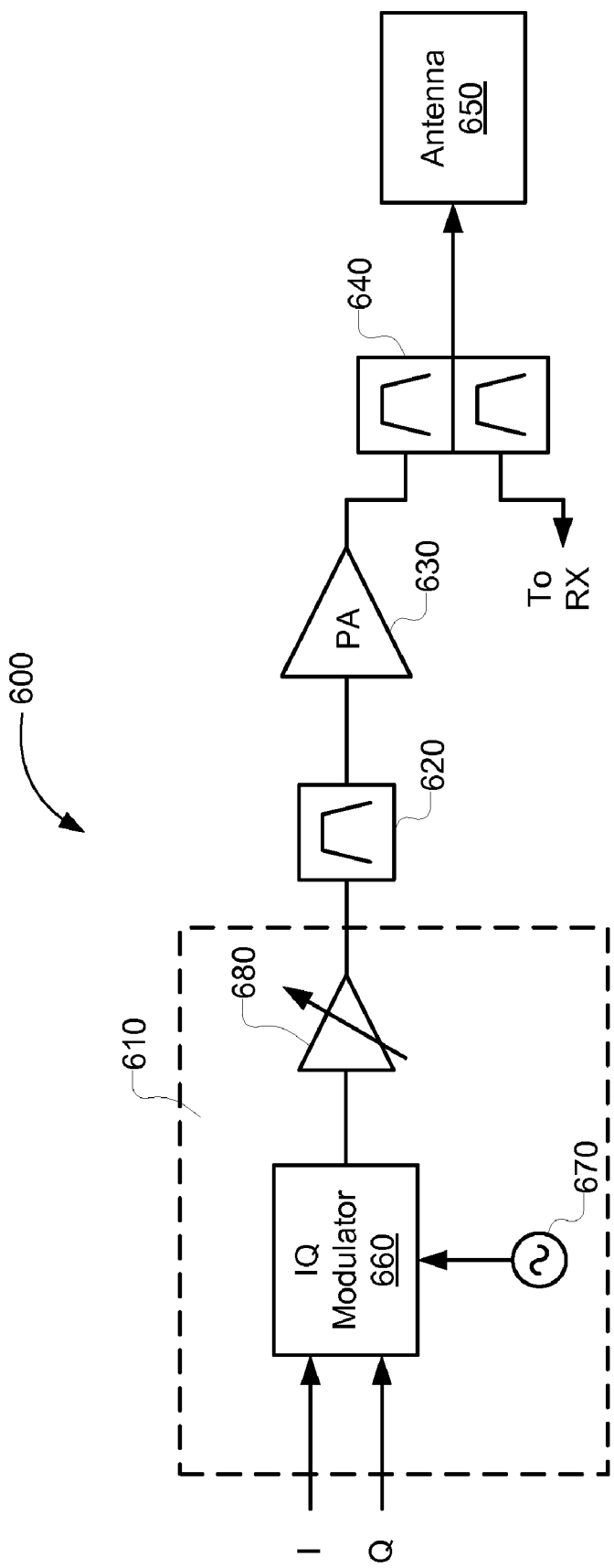
FIG. 6 illustrates an exemplary configuration of a transmitter facility according to principles described herein.

FIG. 6 illustrates an exemplary configuration 600 of transmitter facility 550. The components shown in FIG. 6 are merely illustrative of components that may be included within or implemented by transmitter facility 550. As shown in FIG. 6, transmitter facility 550 may include a modulator 610, a band-pass filter 620, a power amplifier 630, a duplexer 640, and an antenna 650 communicatively coupled one to another.

Modulator 610 may be configured to modulate a data signal onto a carrier signal. As shown in FIG. 6, modulator 610 may include an in-phase/quadrature ("IQ") modulator 660, a local oscillator 670, and a variable gain amplifier 680. These components are merely illustrative of the many different components that may be included within modulator 610. It will be recognized that modulator 610 may include additional or alternative components configured to perform any modulation as may serve a particular application. For example, modulator 610 may be configured to perform IQ modulation (e.g., quadrature amplitude modulation ("QAM")), phase shift keying ("PSK"), binary phase shift keying ("BPSK"), quadrature phase shift keying ("QPSK"), and/or any other type of modulation as may serve a particular application. In the examples given herein, it will be assumed that modulator 610 performs IQ modulation for illustrative purposes only.

To facilitate IQ modulation, a data signal, which may include a control data signal or a content data signal, is divided into an in-phase component (I) and a quadrature (Q) component. The I and Q components of the input signal are input into the IQ modulator 660, as shown in FIG. 6. IQ modulator 660 is configured to modulate the data signal onto a carrier signal provided by local oscillator 670. The frequency of the carrier signal (referred to herein as the "carrier frequency") is chosen such that the resulting frequency (referred to herein as a "transmit frequency") of the modulated signal is within a specified transmit frequency band. The transmit frequency may include a single frequency or plurality of frequencies as may serve a particular application. The modulated signal output by the IQ modulator 660 may be passed through variable gain amplifier 680, which is configured to amplify the modulated signal in accordance with one or more power level specifications.

The modulated signal output by modulator 610 may be passed through a band-pass filter 620 configured to filter out or remove frequency components contained within the modulated signal that are outside a specified range of frequencies. For example, band-pass filter 620 may be configured to remove one or more intermodulation products generated by the modulator 610 that fall outside the frequency range of interest. Band-pass filter 620 may include any type and/or configuration of band-pass filter as may serve a particular application.

After being band-pass filtered, the modulated signal may be passed through a power amplifier 630 configured to amplify the modulated signal to a level suitable for transmission by antenna 650. The power amplifier 630 may include multiple stages, as will be described in more detail below. A duplexer 640 may be included within transmitter facility 550 and configured to allow transmitter facility 550 and receiver facility 540 to share a common antenna 650. To this end, duplexer 640 may include one or more band-pass filters as shown in FIG. 6. It will be recognized that a dedicated transmit antenna may alternatively be used as may serve a particular application.

Antenna 650 may be configured to transmit the modulated signal. In some examples, the modulated signal is transmitted to base station subsystem 110. The modulated signal may additionally or alternatively be transmitted to another access device 120 and/or to any other device as may serve a particular application. It will be recognized that any type of antenna 650 that supports the desired range of transmit frequencies may be used.

Nonlinearities, mismatches, and other imperfections within the modulator 610 often result in undesirable intermodulation products being transmitted by transmitter facility 550. For example, imperfections within modulator 610 may result in carrier leakage. Carrier leakage occurs when the carrier signal generated by the local oscillator 670 leaks to an output of the IQ modulator 660 as well as when a product of the input data signal and the carrier signal is transmitted to the output of the IQ modulator 660. Hence, in some instances, a modulated signal output by modulator 610 may also include a carrier frequency component caused by carrier leakage.

Figure 7:
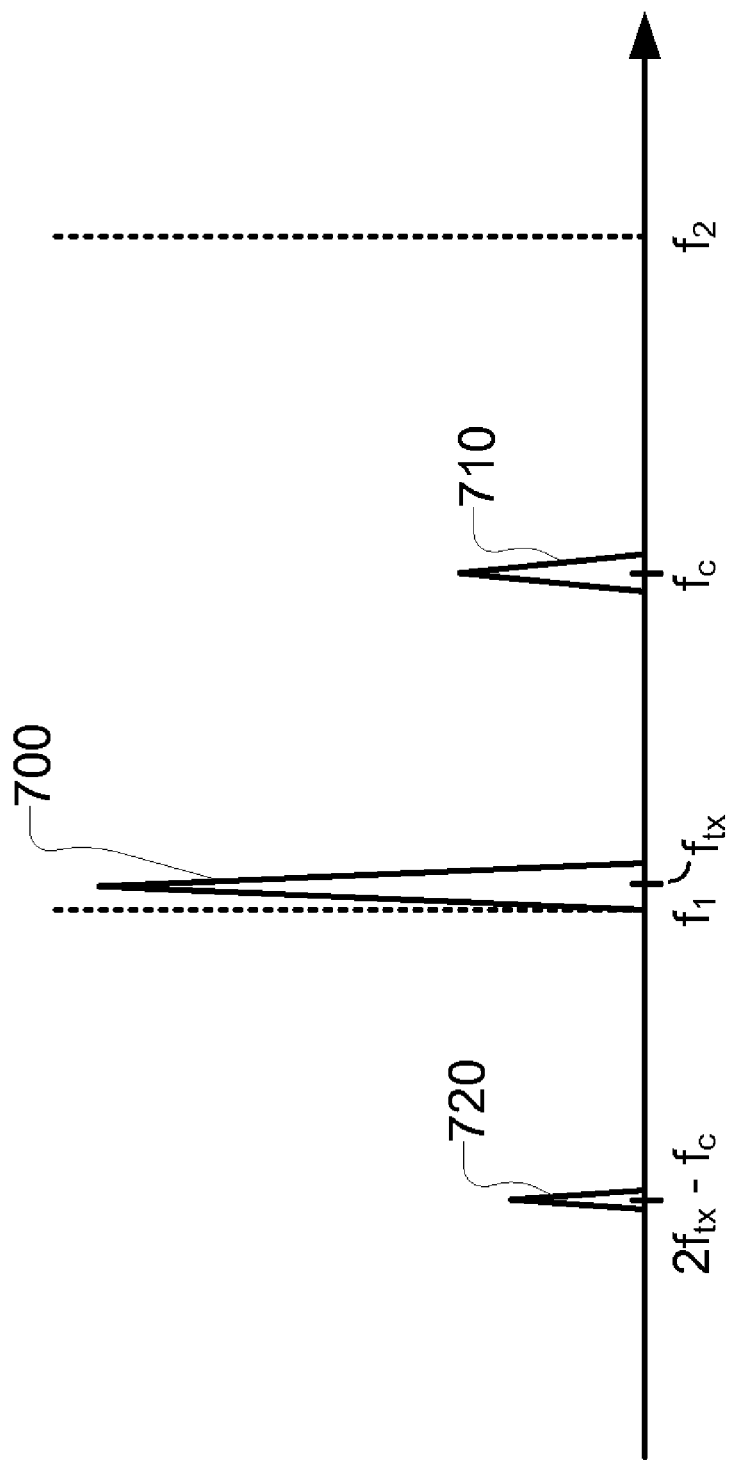
FIG. 7 illustrates an effect of carrier leakage on a transmitted signal in a frequency domain according to principles described herein.

FIG. 7 illustrates an effect of carrier leakage on a transmitted signal in the frequency domain. As shown in FIG. 7, a desired transmit signal 700 with a center frequency of $f_{tx}$ is located within a specified frequency band having boundaries $f_1$ and $f_2$. However, a carrier leakage component 710 and one or more intermodulation products 720 resulting from carrier leakage are also present within the modulated signal output by transmitter facility 550. While one intermodulation product 720 is shown in FIG. 7, it will be recognized that any number of intermodulation products 720 may be present. As shown in FIG. 7, the carrier leakage component 710 is located within the specified frequency band and centered about the carrier frequency $f_c$. The intermodulation product 720 is located outside the specified frequency band and centered about a frequency substantially equal to $2f_{tx}-f_c$. Because the intermodulation product 720 is located outside the specified frequency band, it constitutes a spurious emission.

The likelihood of spurious emissions occurring due to carrier leakage increases the closer the frequency of the desired transmit signal 700 is to boundary $f_1$. Hence, in configurations wherein data signals (e.g., control data signals or content data signals) are transmitted at or near the boundary (e.g., $f_1$) of a specified frequency band, the likelihood of spurious emissions is relatively high.

Figure 8:
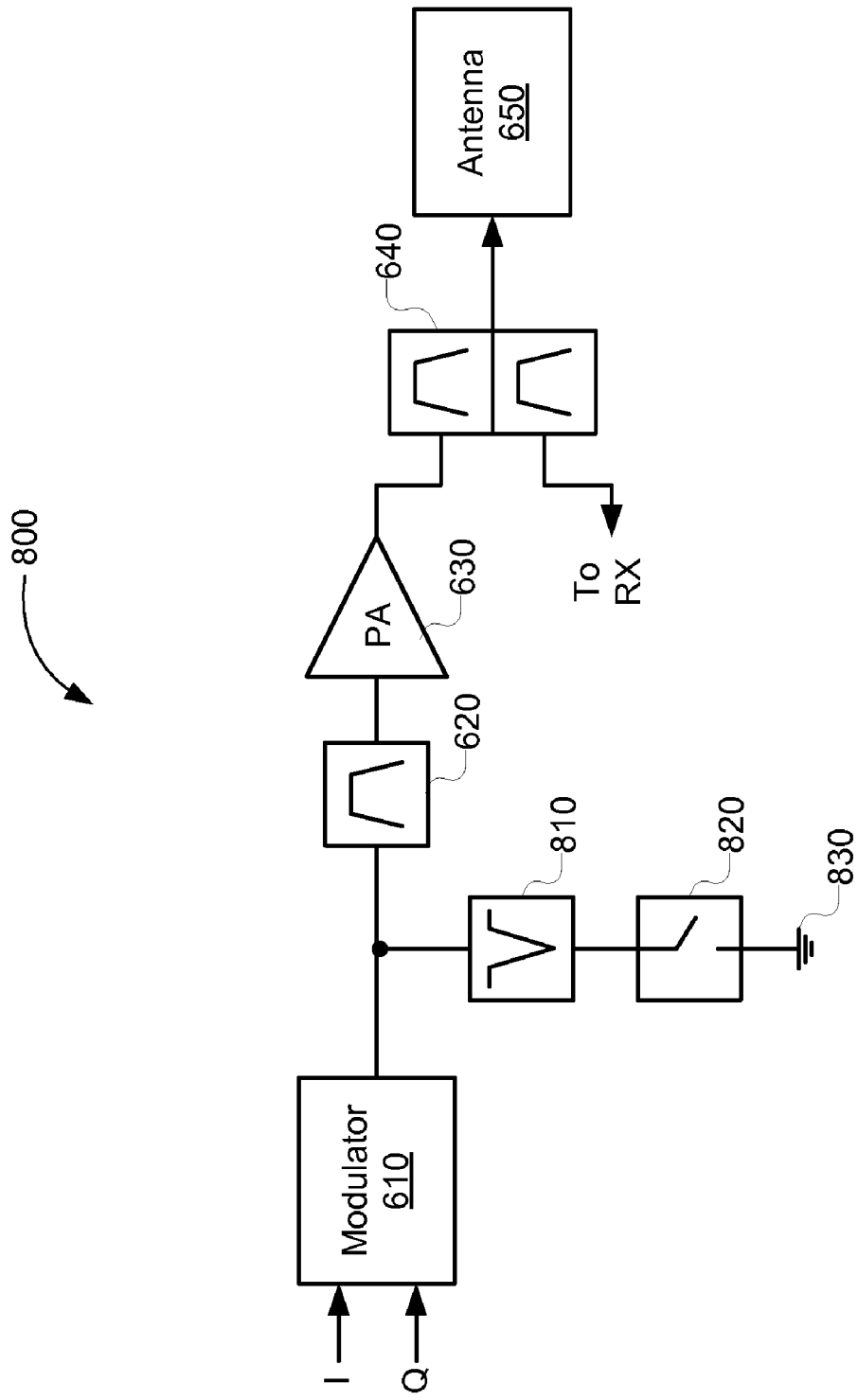
FIG. 8 illustrates an exemplary configuration of a transmitter facility configured to reduce spurious emissions resulting from carrier leakage according to principles described herein.

In some examples, transmitter facility 550 may include one or more filters configured to be selectively enabled to reduce spurious emissions resulting from carrier leakage. FIG. 8 illustrates an exemplary configuration 800 of transmitter facility 550 configured to reduce spurious emissions resulting from carrier leakage. As shown in FIG. 8, the configuration 800 includes a trap filter 810, also referred to as a band-reject filter, configured to be selectively enabled by a switch facility 820. The trap filter 810 may be disposed between modulator 610 and band-pass filter 620, as shown in FIG. 8. The trap filter 810 may be alternatively disposed within transmitter facility 550 in other implementations as will be described in more detail below.

Figure 9:
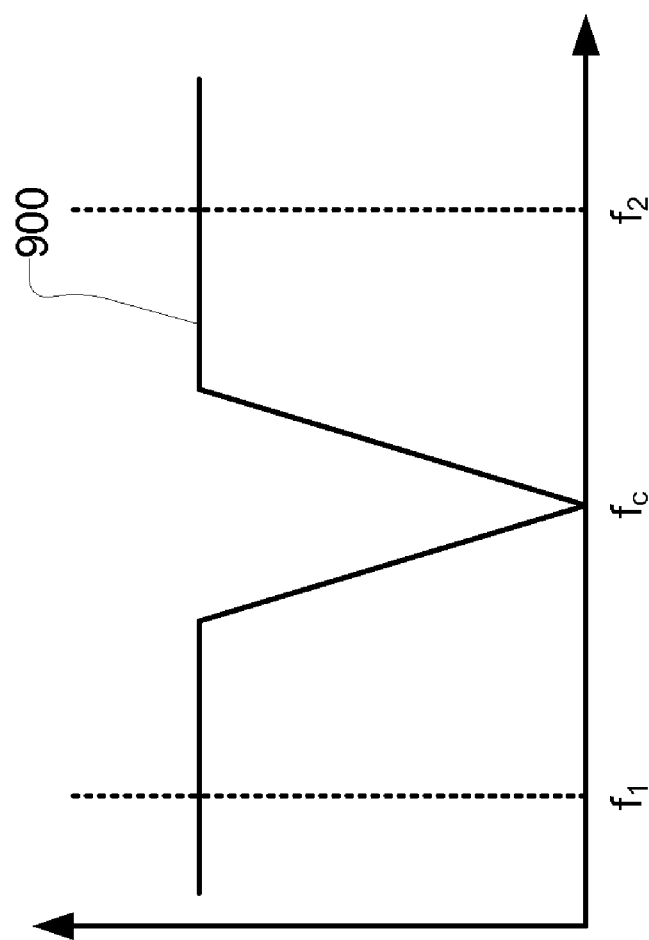
FIG. 9 is a transfer function showing the frequency response of an exemplary trap filter according to principles described herein.

The trap filter 810 may be configured to at least partially remove a carrier frequency component from the modulated signal output by modulator 610. As used herein, a "carrier frequency component" includes a portion of the modulated signal corresponding to the carrier frequency. To illustrate, FIG. 9 is a transfer function showing the frequency response 900 of an exemplary trap filter 810. As shown in FIG. 9, the trap filter 810 is centered such that it at least partially removes a frequency component corresponding to the carrier frequency $f_c$ from a signal that is passed therethrough. The trap filter 810 may have any filter characteristics configured to at least partially remove a carrier frequency component as may serve a particular application and may include any suitable combination of hardware and/or software.

By removing at least at portion of the carrier frequency component from the modulated signal output by modulator 610, the amplitude of the carrier leakage component 710 and the intermodulation product 720 resulting from carrier leakage may be reduced. In some examples, the carrier leakage component 710 and/or the intermodulation product 720 may be entirely eliminated.

Returning to FIG. 8, switch facility 820 may include any combination of hardware and computing instructions configured to selectively enable and disable trap filter 810. For example, switch facility 820 may be configured to selectively connect trap filter 810 to ground 830. When connected to ground 830, trap filter 810 is effectively enabled. When switch facility 820 is open, trap filter 810 is effectively disabled. In this manner, trap filter 810 may be selectively enabled or disabled depending on the signal being passed therethrough.

Switch facility 820 may be programmed or otherwise configured to selectively enable trap filter 810 for modulated signals having a transmit frequency within a predefined frequency range adjacent to and within a boundary of an uplink frequency band. The predefined range may include any number of frequencies as may serve a particular application. For example, the predefined frequency range may include one or more frequencies within a frequency band that are less than or greater than the carrier frequency. In uplink frequency bands such as the Upper 700 MHz C-Block where certain resource blocks 400 adjacent to a boundary of the frequency band are allocated for the transmission of control data signals (e.g., PUCCH signals), the predefined frequency range may include frequencies contained within those allocated resource blocks 400.

Switch facility 820 may be further programmed or otherwise configured to selectively disable trap filter 810 for modulated signals having a transmit frequency outside the predefined frequency range and within the uplink frequency band. Such signals may contain desired content at or near the carrier frequency. Hence, removal of the carrier frequency component from these signals may be avoided by disabling trap filter 810. Spurious emissions limits may be complied with even though trap filter 810 is disabled by utilizing other techniques such as transmit power reduction and network scheduling.

In some examples, transmitter facility 550, processing facility 510, and/or any other component of access device 120 may be configured to determine whether a modulated signal has a transmit frequency within the predefined frequency range in order to direct switch facility 810 to selectively enable or disable trap filter 810. Such determination may be performed in accordance with any suitable signal analysis, algorithm, or heuristic.

An example of selectively enabling trap filter 810 to reduce spurious emissions resulting from carrier leakage will now be described in connection with uplink frequency band 320. As shown in FIG. 4, the first two resource blocks 410 within uplink frequency band 320 may be allocated for the transmission of PUCCH signals. Resource blocks 430 may be allocated for the transmission of PUSCH signals. Hence, switch facility 820 may be configured to selectively enable trap filter 810 for the processing and transmission of PUCCH signals within the first two resource blocks 410 and to selectively disable trap filter 810 for the processing and transmission of PUSCH signals within resource blocks 430. In this manner, spurious emissions resulting from carrier leakage during the transmission of PUCCH signals may be reduced or eliminated. This may allow PUCCH signals to be transmitted with maximum transmit power, thus maximizing coverage within a cell.

A number of alternative transmitter facility configurations that may be used to reduce spurious emissions resulting from carrier leakage will now be described in connection with FIGS. 10-17. It will be recognized that these configurations are merely illustrative, and that additional or alternative configurations may be used in accordance with the systems and methods described herein.

Figure 10:
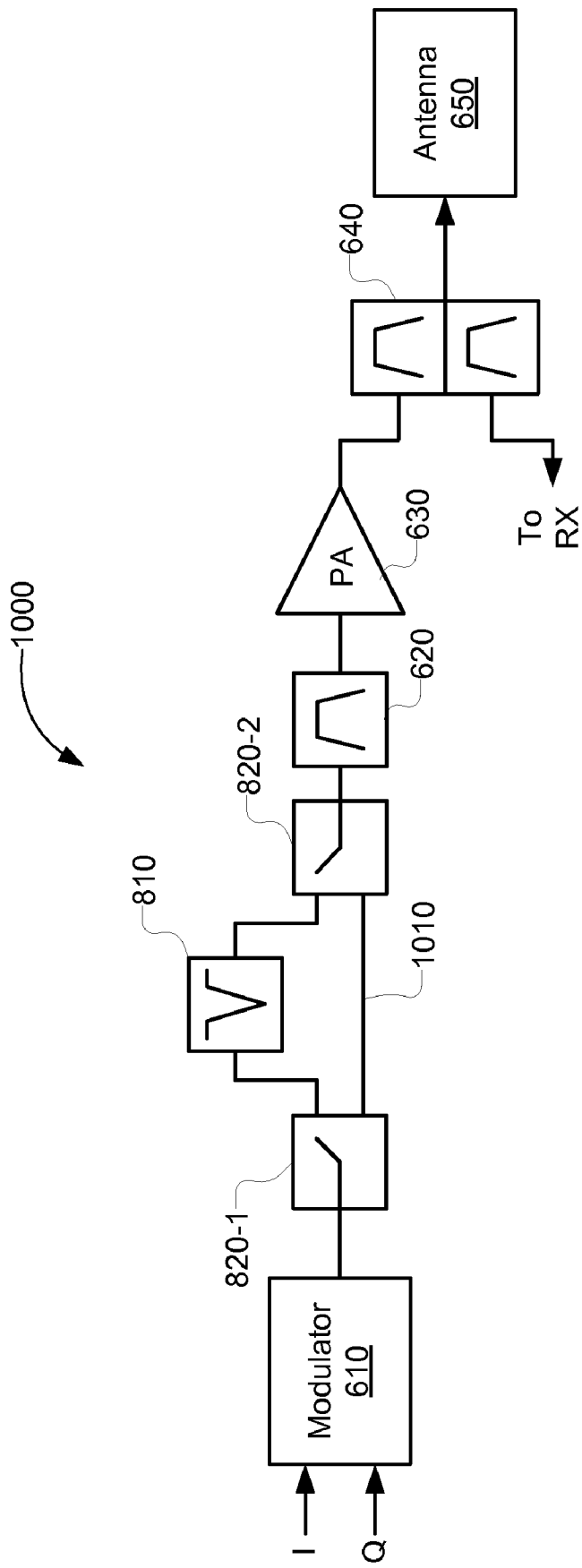
FIG. 10 illustrates another exemplary configuration of a transmitter facility configured to reduce spurious emissions resulting from carrier leakage according to principles described herein.

FIG. 10 illustrates an exemplary transmitter facility configuration 1000 wherein switch facilities 820-1 and 820-2 are configured to selectively couple either trap filter 810 or a pass through line 1010 to the output of modulator 610. Switch facilities 820-1 and 820-2 may be similar to switch facility 820 described above. To enable trap filter 810, switch facilities 820-1 and 820-2 may switch to a first position or state configured to couple the input of trap filter 810 to the output of modulator 610 and the output of trap filter 810 to the input of band-pass filter 620. To disable trap filter 810, switch facilities 820-1 and 820-2 may switch to a second position or state configured to couple the output of modulator 610 directly to the input of band-pass filter 620.

Figure 11:
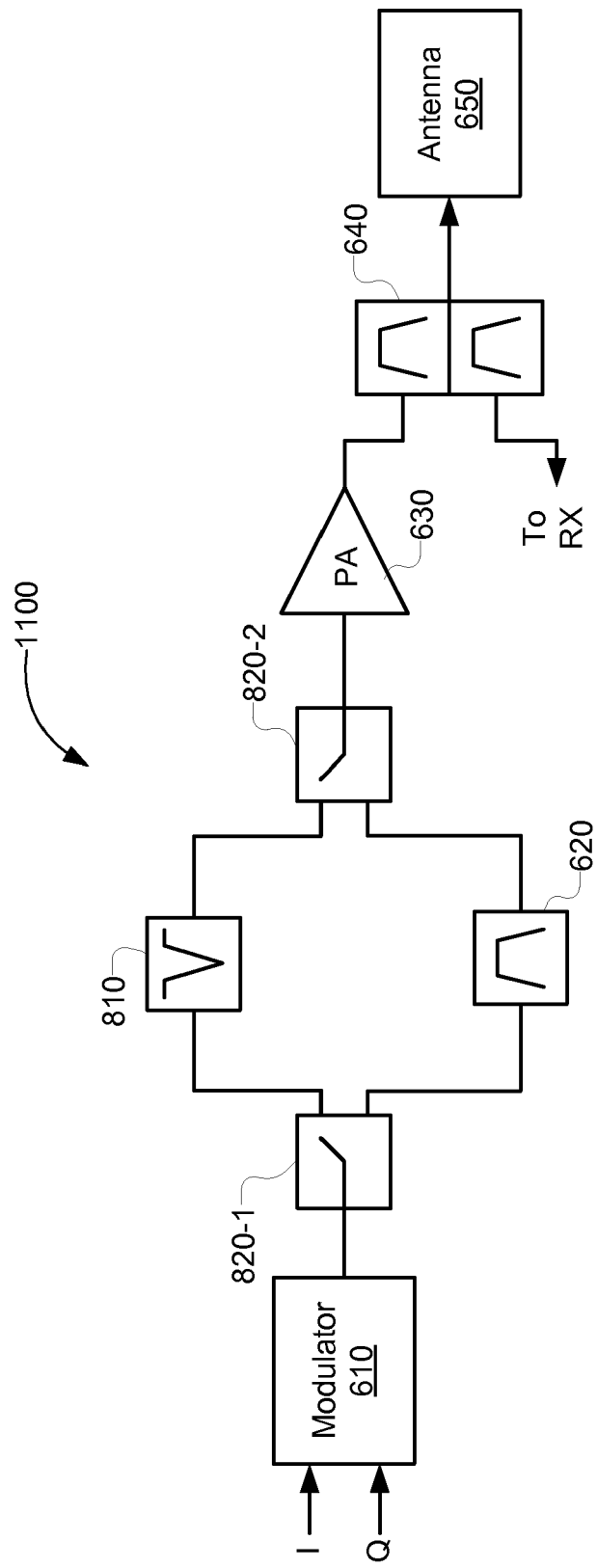
FIG. 11 illustrates another exemplary configuration of a transmitter facility configured to reduce spurious emissions resulting from carrier leakage according to principles described herein.

FIG. 11 illustrates another exemplary transmitter facility configuration 1100 wherein switch facilities 820-1 and 820-2 are configured to selectively couple either trap filter 810 or band-pass filter 620 to the output of modulator 610. Configuration 1100 may be used in situations where it is desirable for modulated signals designated to pass through trap filter 810 to not be processed by band-pass filter 620. To enable trap filter 810, switch facilities 820-1 and 820-2 may switch to a first position or state configured to couple the input of trap filter 810 to the output of modulator 610 and the output of trap filter 810 to the input of power amplifier 630. To disable trap filter 810, switch facilities 820-1 and 820-2 may switch to a second position or state configured to couple the input of band-pass filter 620 to the output of modulator 610 and the output of band-pass filter 620 to the input of power amplifier 630.

Figure 12:
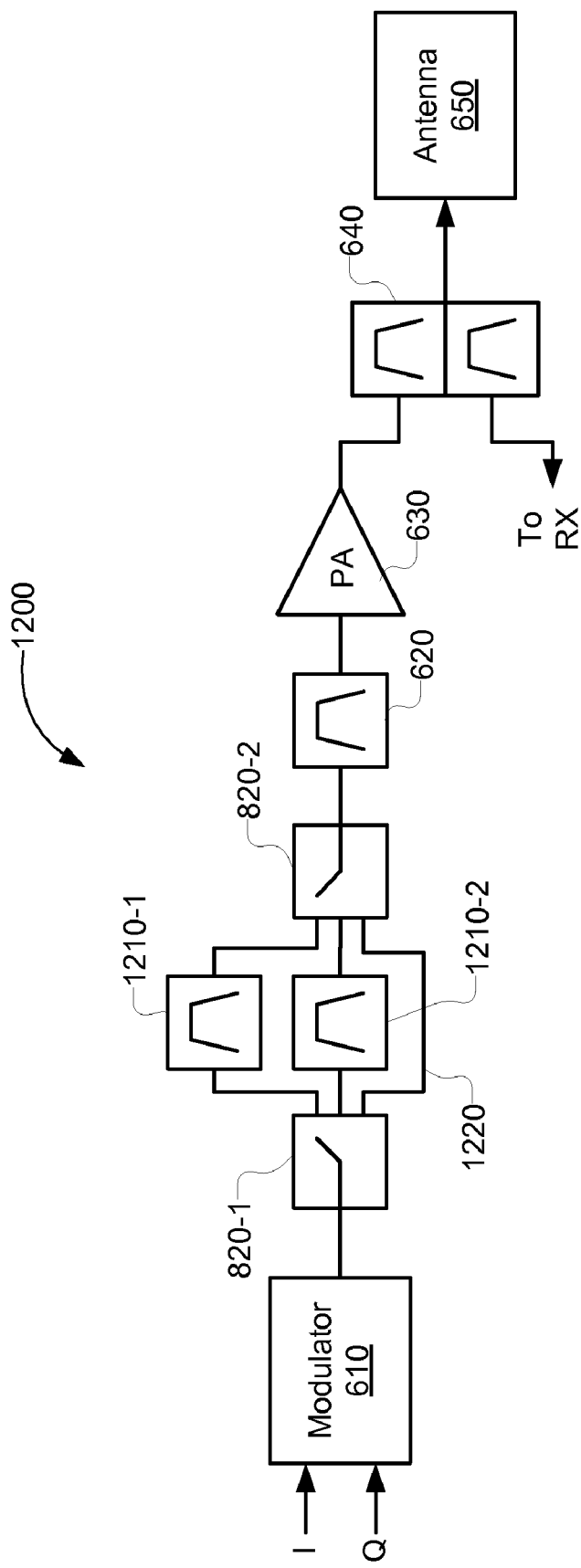
FIG. 12 illustrates another exemplary configuration of a transmitter facility configured to reduce spurious emissions resulting from carrier leakage according to principles described herein.

FIG. 12 illustrates another exemplary transmitter facility configuration 1200 wherein switch facilities 820-1 and 820-2 are configured to selectively enable one of a plurality of band-pass filters (e.g., band-pass filters 1210-1 and 1210-2, collectively referred to herein as "band-pass filters 1210") configured to remove a carrier frequency component from a modulated signal. Each band-pass filter 1210 may be configured to pass distinct ranges of frequencies and may include any combination of hardware and software as may serve a particular application.

Figure 13:
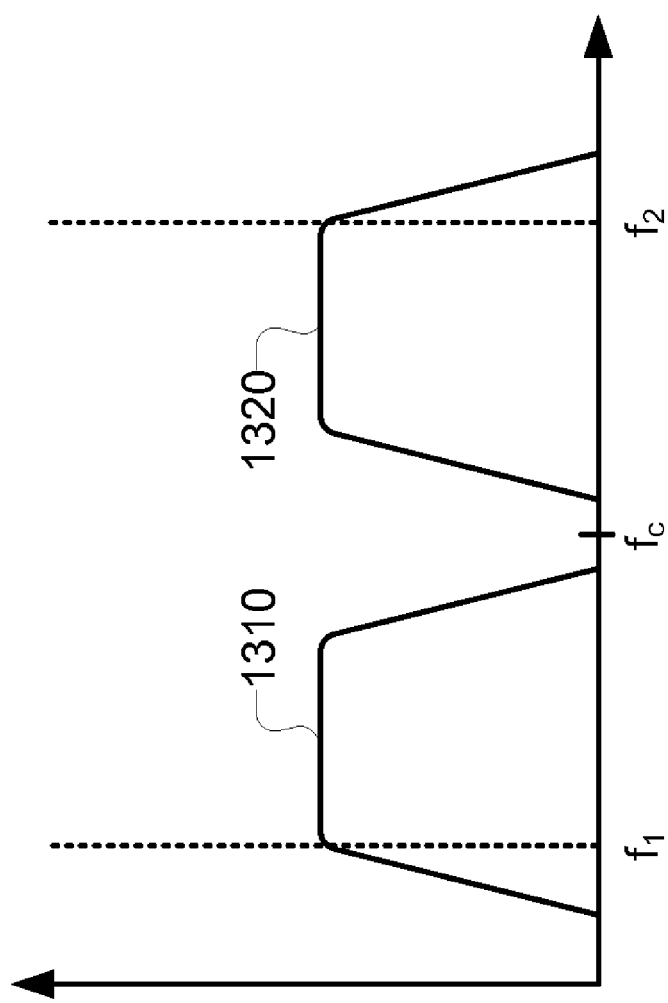
FIG. 13 is a transfer function showing exemplary frequency responses of band-pass filters according to principles described herein.

For example, FIG. 13 is a transfer function showing exemplary frequency responses 1310-1 and 1310-2 of band-pass filters 1210-1 and 1210-2, respectively. As shown FIG. 13, the frequency response 1310-1 corresponding to band-pass filter 1210-1 is configured to pass a range of frequencies that are less than the carrier frequency $f_c$. The frequency response 1310-2 corresponding to band-pass filter 1210-2 is configured to pass a range of frequencies that are greater than the carrier frequency $f_c$. Band-pass filter 1210-1 may be selectively enabled by switch facilities 820-1 and 820-2 for modulated signals having transmit frequencies less than the carrier frequency, and band-pass filter 1210-2 may be selectively enabled by switch facilities 820-1 and 820-2 for modulated signals having transmit frequencies greater than the carrier frequency. Both band-pass filters 1210 may be disabled by switch facilities 820-1 and 820-2 for modulated signals having transmit frequencies substantially equal to or within a predefined range of the carrier frequency. To this end, switch facilities 820-1 and 820-2 may be configured to selectively couple the output of modulator 610 directly to band-pass filter 620 via a pass through line 1220.

Figure 14:
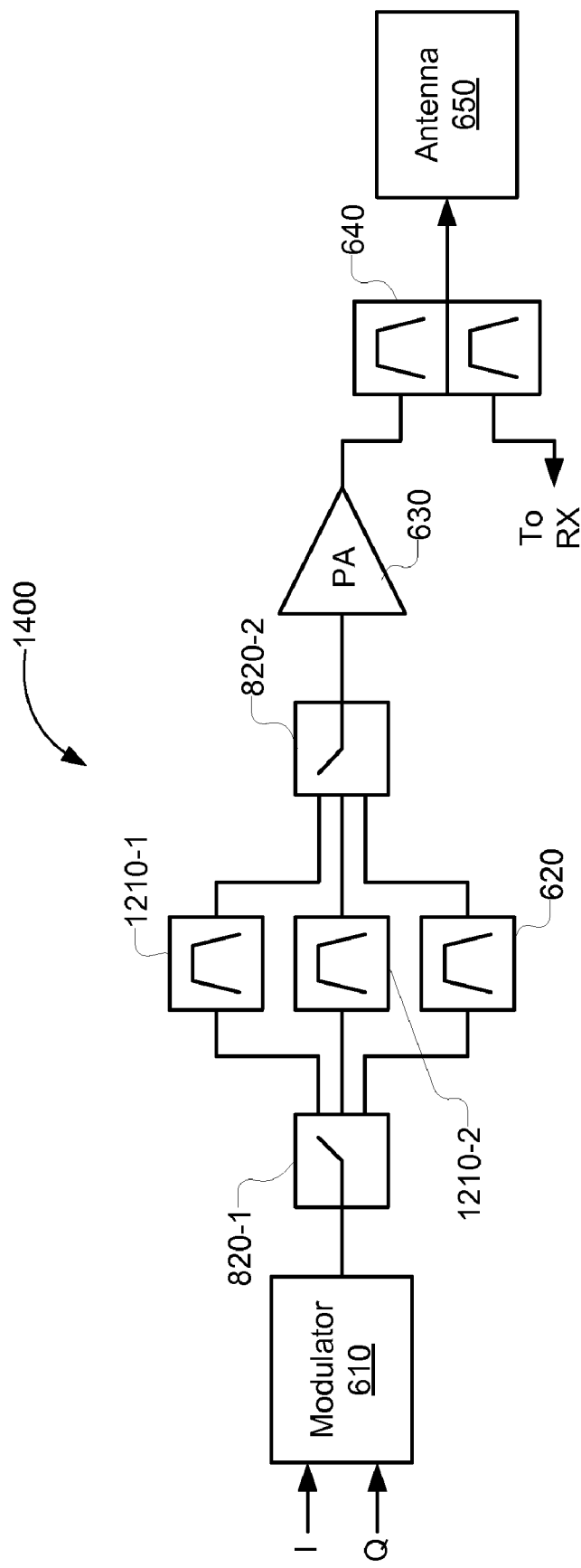
FIG. 14 illustrates another exemplary configuration of a transmitter facility configured to reduce spurious emissions resulting from carrier leakage according to principles described herein.

FIG. 14 illustrates another exemplary transmitter facility configuration 1400 wherein switch facilities 820-1 and 820-2 are configured to selectively enable one of band-pass filter 1210-1, band-pass filter 1210-2, and band-pass filter 620. Band-pass filters 1210-1 and 1210-2 were described previously in connection with FIG. 12. Configuration 1400 may be used in situations wherein it is desirable for modulated signals designated to pass through one of the band-pass filters 1210 to not be processed by band-pass filter 620.

Figure 15:
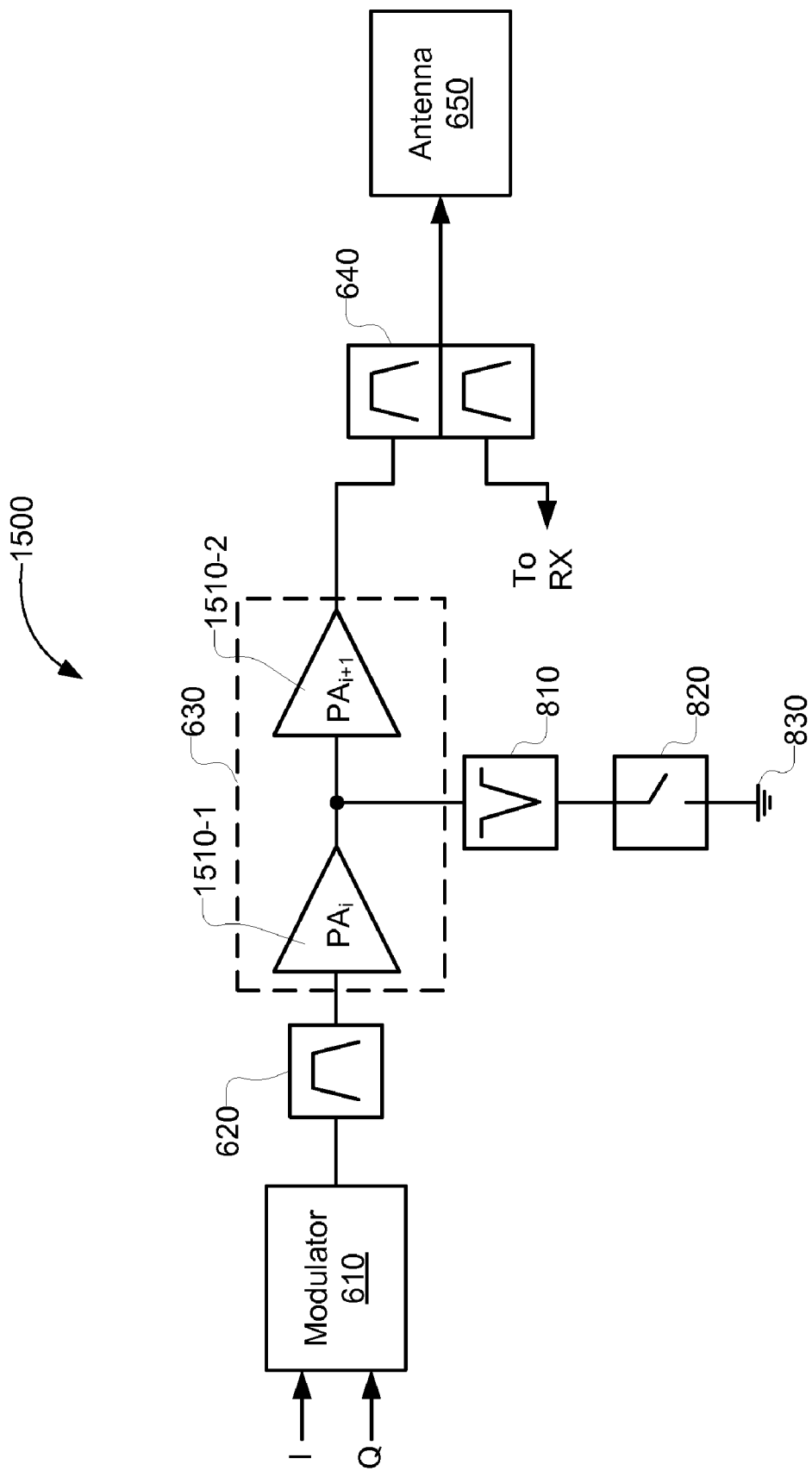
FIG. 15 illustrates another exemplary configuration of a transmitter facility configured to reduce spurious emissions resulting from carrier leakage according to principles described herein.

FIG. 15 illustrates another exemplary transmitter facility configuration 1500 wherein the trap filter 810 and switch facility 820 described in connection with FIG. 8 are disposed between power amplifier stages (e.g., stages 1510-1 and 1510-2) included within power amplifier 630. Configuration 1500 may be used in situations wherein it is desirable to amplify the modulated signal to a predetermined level before removing a carrier component therefrom. It will be recognized that power amplifier 630 may include any number of stages 1510-1 and 1510-2 as may serve a particular application and that trap filter 810 may be disposed between any two of the stages 1510-1 and 1510-2 as may serve a particular application.

Figure 16:
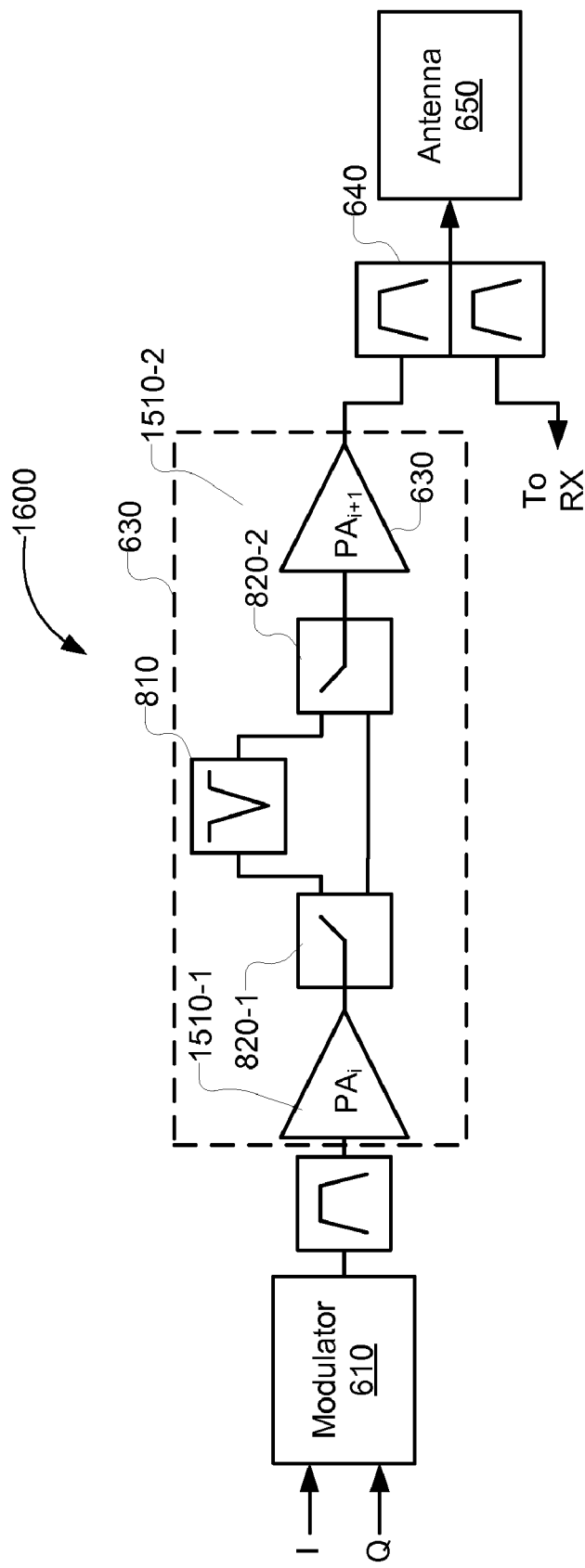
FIG. 16 illustrates another exemplary configuration of a transmitter facility configured to reduce spurious emissions resulting from carrier leakage according to principles described herein.

FIG. 16 illustrates another exemplary transmitter facility configuration 1600 wherein the trap filter 810 and switching facilities 820-1 and 820-2 described in connection with FIG. 10 are disposed between power amplifier stages 1510-1 and 1510-2. Configuration 1600 may be used in situations wherein it is desirable to amplify the modulated signal to a predetermined level before removing a carrier component therefrom. It will be recognized that trap filter 810 and switching facilities 820-1 and 820-2 may be disposed between any two power amplifier stages 1510-1 and 1510-2 as may serve a particular application.

Figure 17:
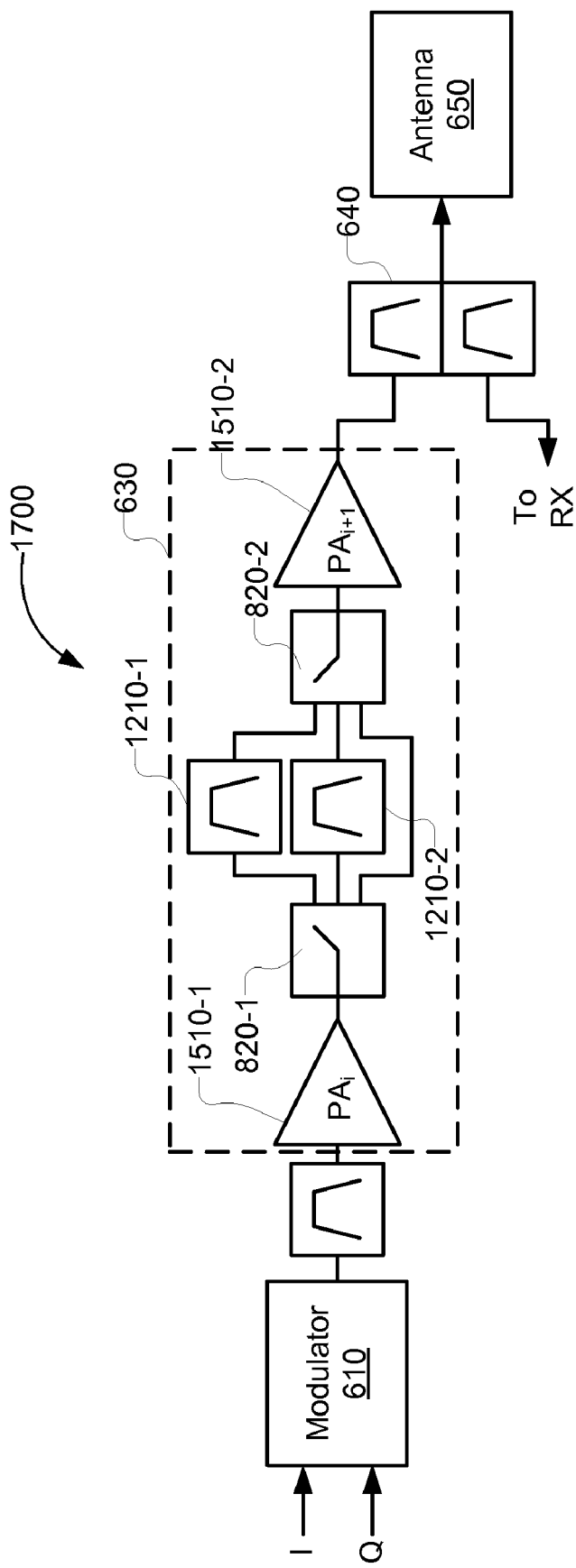
FIG. 17 illustrates another exemplary configuration of a transmitter facility configured to reduce spurious emissions resulting from carrier leakage according to principles described herein.

FIG. 17 illustrates another exemplary transmitter facility configuration 1700 wherein the band-pass filters 1210-1 and 1210-2 and switching facilities 820-1 and 820-2 described in connection with FIG. 12 are disposed between power amplifier stages 1510-1 and 1510-2. Configuration 1700 may be used in situations wherein it is desirable to amplify the modulated signal to a predetermined level before removing a carrier component therefrom. It will be recognized that band-pass filters 1210-1 and 1210-2 and switching facilities 820-1 and 820-2 may be disposed between any two power amplifier stages 1510-1 and 1510-2 as may serve a particular application.

Figure 18:
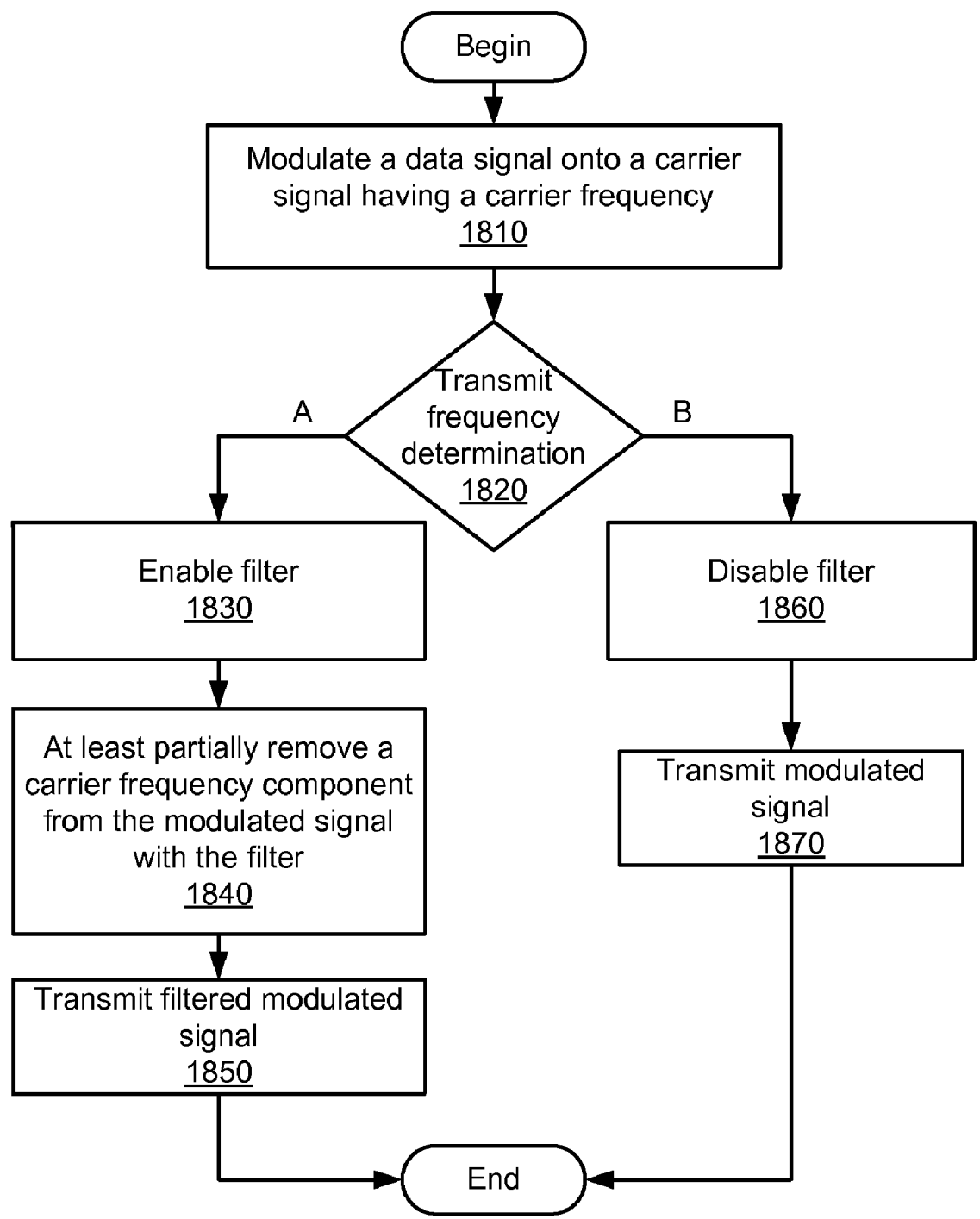
FIG. 18 illustrates an exemplary method of reducing spurious emissions resulting from carrier leakage according to principles described herein.

FIG. 18 illustrates an exemplary method of reducing spurious emissions resulting from carrier leakage. While FIG. 18 illustrates exemplary steps according to one embodiment, other embodiments may omit, add to, reorder, and/or modify any of the steps shown in FIG. 18.

In step 1810, a data signal is modulated onto a carrier signal having a carrier frequency. The modulation may be performed in any of the ways described herein.

In step 1820, a transmit frequency determination for the modulated signal is performed. The transmit frequency determination may be performed by any of the facilities within an access device 120 as may serve a particular application. For example, processing facility 510 and/or transmitter facility 550 may be configured to perform the determination.

If it is determined that the transmit frequency of the modulated signal is within a predefined frequency range adjacent to and within a boundary of an uplink frequency band (determination "A" in FIG. 18), a filter is enabled, as shown in step 1830. The filter may be enabled in any of the ways described herein. For example, one or more switching facilities may be configured to selectively enable the filter as described herein.

In step 1840, a carrier frequency component is at least partially removed from the modulated signal with the filter. The carrier frequency component may be removed in any of the ways described herein.

In step 1850, the filtered modulated signal is transmitted. The filtered modulated signal may be transmitted in any of the ways described herein.

Alternatively, if it is determined in step 1820 that the transmit frequency of the modulated signal is outside the predefined frequency range (determination "B" in FIG. 18), the filter is disabled, as shown in step 1860. In this manner, a carrier frequency component of the modulated signal is not removed therefrom. The modulated signal is then transmitted, as shown in step 1870.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus comprising:
a modulator configured to modulate a data signal onto a carrier signal to generate a modulated signal having a transmit frequency within a predefined frequency range adjacent to and within a boundary of an uplink frequency band, said carrier signal having a carrier frequency;

a filter configured to at least partially remove a carrier frequency component from said modulated signal to produce a filtered modulated signal;

an antenna configured to transmit said filtered modulated signal; and a switch facility communicatively coupled to said filter;

wherein said modulator is further configured to modulate another data signal onto another carrier signal to generate another modulated signal having a transmit frequency within said uplink frequency band and outside said predefined frequency range, said another carrier signal having said carrier frequency; and wherein said switch facility is configured to selectively disable said filter to prevent said filter from removing a carrier frequency component from said another modulated signal.

2. The apparatus of claim 1, wherein said another data signal comprises a physical uplink shared channel signal.

3. The apparatus of claim 1, wherein said antenna is further configured to transmit said another modulated signal.

4. The apparatus of claim 1, wherein said filter is configured to reduce at least one intermodulation product resulting from carrier leakage associated with said carrier signal.

5. The apparatus of claim 1, wherein said data signal comprises a control data signal.

6. The apparatus of claim 1, wherein said data signal comprises a physical uplink control channel signal.

7. The apparatus of claim 1, wherein said uplink frequency band is adjacent to a downlink frequency band.

8. The apparatus of claim 1, further comprising a power amplifier configured to amplify said filtered modulated signal prior to transmission of said filtered modulated signal by said antenna.

9. The apparatus of claim 1, wherein said filter comprises a trap filter.

10. The apparatus of claim 1, wherein said filter comprises a band-pass filter.

11. The apparatus of claim 1, wherein said predefined frequency range comprises one or more resource blocks allocated for transmission of one or more control data signals.

12. The apparatus of claim 1, wherein said carrier frequency is outside of said predefined frequency band.

13. A system comprising:

a processing facility configured to generate a first data signal and a second data signal; and a transmitter facility communicatively coupled to said processing facility, said transmitter facility configured to modulate said first data signal onto a carrier signal to generate a modulated first signal having a transmit frequency within a predefined frequency range adjacent to and within a boundary of an uplink frequency band, said carrier signal having a carrier frequency, modulate said second data signal onto another carrier signal to generate a modulated second signal having a transmit frequency within said uplink frequency band and outside said predefined frequency range, said another carrier signal having said carrier frequency, at least partially remove a carrier frequency component from said modulated first signal to produce a filtered modulated first signal, and transmit said filtered modulated first signal and said modulated second signal.

14. The system of claim 13, wherein said first data signal comprises a physical uplink control channel signal and said second data signal comprises a physical uplink shared channel signal.

15. The system of claim 13, wherein said uplink frequency band is adjacent to a downlink frequency band.

16. The system of claim 13, wherein said carrier frequency is outside of said predefined frequency band.

17. A method comprising:

generating a first modulated signal having a transmit frequency within a predefined frequency range adjacent to and within a boundary of an uplink frequency band;

generating a second modulated signal having a transmit frequency within said uplink frequency band and outside said predefined frequency range;

enabling a filter to selectively remove a carrier frequency component from said first modulated signal; and disabling said filter to prevent said filter from removing a carrier frequency component from said second modulated signal.

18. The method of claim 17, further comprising transmitting said filtered first modulated signal and said second modulated signal.

19. The method of claim 17, wherein said first modulated signal comprises a control data signal and said second modulated signal comprises a content data signal.

* * * * *